(12) United States Patent
Hebert

(10) Patent No.: US 6,442,903 B1
(45) Date of Patent: Sep. 3, 2002

(54) INFLATABLE INSULATIVE COVERING

(76) Inventor: Thomas H. Hebert, 1340 Eastwood Dr., Lutz, FL (US) 33612

( * ) Notice: Subject to any disclaimer, the term of this patent is extended or adjusted under 35 U.S.C. 154(b) by 0 days.

(21) Appl. No.: 09/711,764

(22) Filed: Nov. 13, 2000

(51) Int. Cl.[7] ............................... E04B 1/34
(52) U.S. Cl. ................ 52/2.11; 52/2; 52/64; 52/83; 52/2.18; 47/17; 47/29.1; 47/28.1
(58) Field of Search ............... 52/2.18, 2.11, 52/64; 47/29.1, 17

(56) References Cited

U.S. PATENT DOCUMENTS

| | | | | |
|---|---|---|---|---|
| 3,938,429 A | * | 2/1976 | Perry ........................... 98/37 |
| 4,027,437 A | * | 6/1977 | Monsky et al. ................. 52/2 |
| 4,039,019 A | | 8/1977 | Hopper ....................... 160/121 |
| 4,064,648 A | | 12/1977 | Cary ............................ 47/17 |
| RE30,254 E | * | 4/1980 | Rasmussen ............... 160/84 R |
| 4,290,242 A | * | 9/1981 | Gregory, Jr. ..................... 52/2 |
| 4,301,626 A | * | 11/1981 | Davis et al. .................... 52/2 |
| 4,318,251 A | * | 3/1982 | Winkler ......................... 52/2 |
| 4,352,259 A | * | 10/1982 | Smith et al. .................... 52/2 |
| 4,462,390 A | | 7/1984 | Holdridge, et al. ......... 126/420 |
| 4,672,888 A | * | 6/1987 | Crombie et al. ............... 98/29 |
| 4,699,316 A | * | 10/1987 | Johnson ....................... 237/69 |
| 5,335,447 A | | 8/1994 | Bee .............................. 47/17 |
| 6,000,170 A | | 12/1999 | Davis ............................ 47/17 |
| 6,112,797 A | * | 9/2000 | Colson et al. ............ 160/121.1 |

* cited by examiner

Primary Examiner—Carl D. Friedman
Assistant Examiner—Basil Katcheves
(74) Attorney, Agent, or Firm—Holland & Knight LLP

(57) ABSTRACT

An apparatus for regulating the transmission of energy through an energy transmissive structure having at least one energy transmissive panel comprising in combination at least one elongated support adjacent to the energy transmissive panel of the energy transmissive structure. A polymer bag made of polyethylene terephthalate encapsulates the elongated support which allows the polymer bag to be inflated or deflated around the elongated support. The outer surface of the polymer bag has a reflective coating for reflecting energy through the energy transmissive structure. There is at least one elongated weight attached to the polymer bag to ensure that the polymer bag is maintained in its optimum position. There is at least one air distribution header attached to the elongated support to inflate or deflate the polymer bag. In an inflated state, the polymer bag blocks the transmission of energy and in a deflated state, the polymer bag allows the transmission of energy through the transmissive energy panel of the energy transmissive structure.

18 Claims, 10 Drawing Sheets

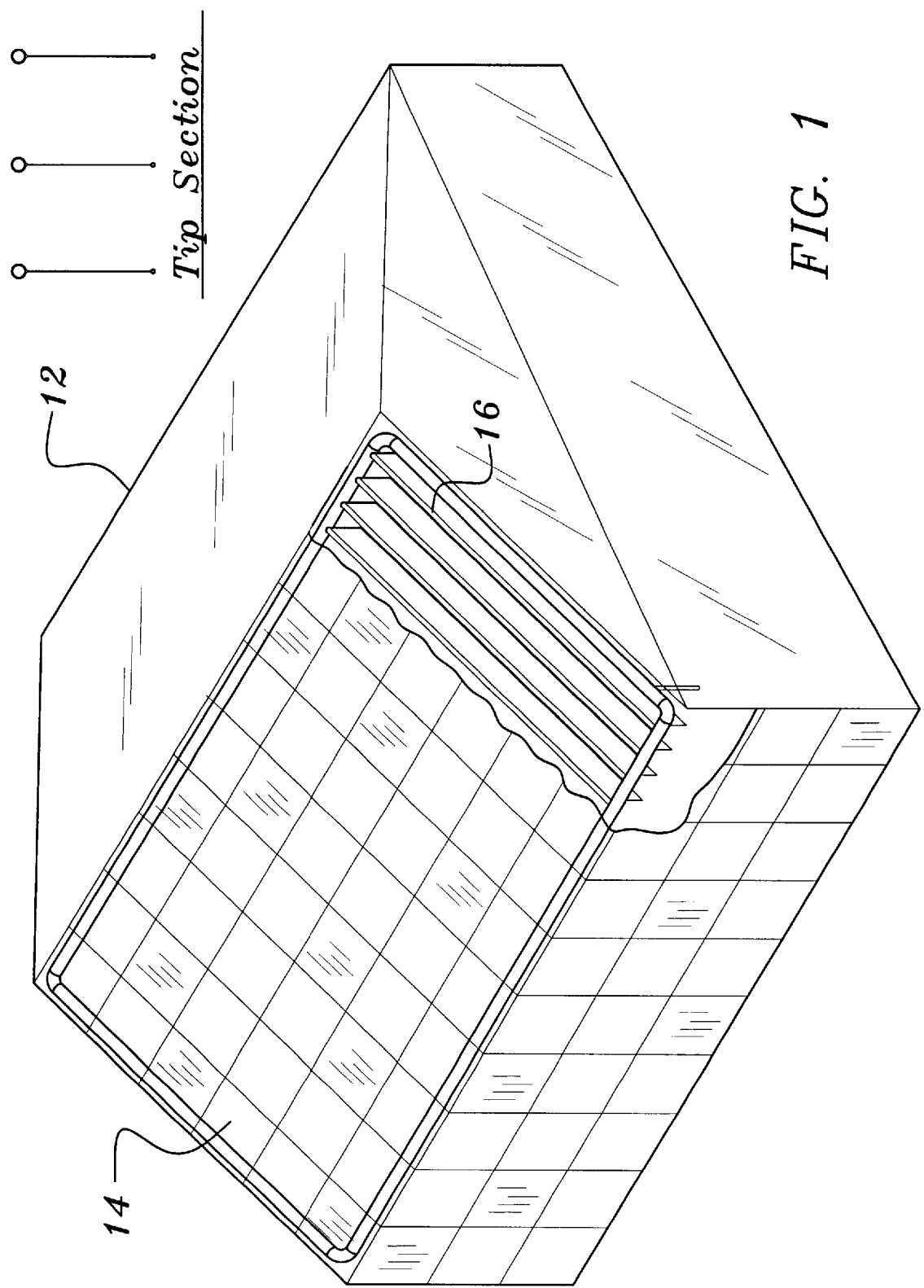

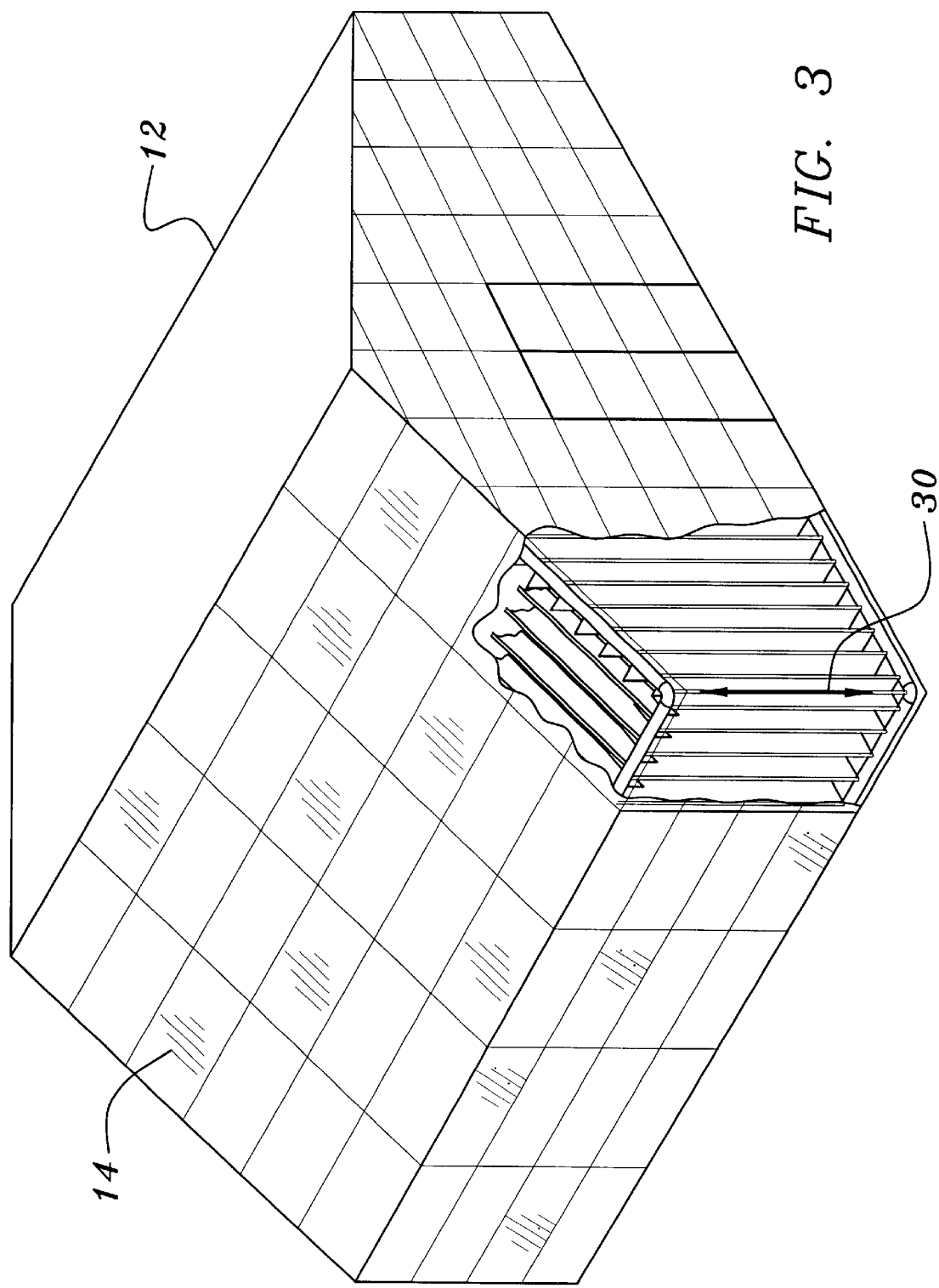

INFLATABLE INSULATIVE COVERING

BACKGROUND OF THE INVENTION

1. Field of the Invention

This invention pertains to a system for regulating the amount of solar energy entering, and the amount of heat transferred, through the roof of a greenhouse, an atrium, a skylight or a similar glazed opening.

2. Description of the Background Art

The design of a building can often be accented by furnishing a portion of the building with a "greenhouse" environment or an atrium covered by transparent or translucent material. Certain areas of the building are enclosed with glass to provide the greenhouse effect. Such an effect is most desirable because of the open feeling associated therewith which is carried into the surrounding interior space. Even small portions of a building providing a "greenhouse" effect gives the feeling of the entire building being open to the outdoors.

However, energy conservation with a transparent or translucent structure can be poor. In winter, the heat from the interior of the enclosure is conducted and radiated outside through the glass. In summer, the radiant energy of the sun is transmitted inside, thereby greatly increasing the demand for air conditioning. In short, the area of the building that is covered by a transparent or translucent material is cold in winter and hot in summer. Large quantities of energy must be expended to overcome these effects in attempting to provide a stable environment.

Solar greenhouses may be elegantly designed and proportioned to complement the beauty of a dwelling. They provide a versatile form of additional living space that can capture and store solar energy. Provision is thus made for a practical addition which confines a place in the sun for gardening, dining, lounging and so forth. In fact, such additional spaces have been used for accommodating hot tubs and spa accoutrements and the like.

Typically, greenhouses are structures with light transparent roofs and in many cases, light transparent walls. Heat is provided for the greenhouses both by fuel consuming heaters and solar heat passing through the light transparent sections of the greenhouse.

Up to 90% of the heat loss from conventional greenhouses occurs at night and during other dark or overcast periods. Accordingly, some greenhouses presently employ a variety of conventional insulating mats, shades, curtains and heat blankets for covering the transparent panes of the greenhouse and thereby slowing the escape of heat during periods of darkness. See, for example, U.S. Pat. No. 4,318,251. Such devices are also used to regulate the amount of sunlight entering the greenhouse and thereby the flowering cycles of certain plants.

One attempt to insulate greenhouses is an inflated polyethylene double cover wherein two layers of very large sheets of polyethylene are draped over the outside of a greenhouse roof and provided with an internal air layer to form a heat insulation barrier. The apparatus is clumsy, laborious to assemble, exposed to the elements and reduces ventilation.

U.S. Pat. No. 4,064,648 issued Dec. 27, 1977, to C. L. Cary provides an insulating system for reducing heat loss from a structure during one part of the day and for permitting light to enter the structure during another part of the day. This system includes a roll mounted within the structure, a flexible sheet of material wound around the roll, a structure for supporting the roll immediate its length and engaging portions of the wound sheet, and means both for unwinding the sheet from the roll and deploying it in a plane and for rotating the roll to rewind the sheet there around. However, this approach is very uneconomical because of the complexity.

U.S. Pat. No. 6,000,170 issued Dec. 14, 1999 to Davis entitled "Light Energy Shutter System" provides an insulating system for reducing heat loss from a structure during one part of the day and for permitting light to enter the structure during another part of the day. This system includes a pneumatically operated shutter that is basically a tube that expands and contracts based on inflation and deflation, respectively. A transition sleeve made of cloth is inserted at each end of the tube to "encourage the inflatable tubes to collapse to parallel thin sheets".

All of the disclosures of the above stated prior art patents are incorporated herein by reference.

None of the above-identified patents teach the combination of structural elements disclosed and claimed herein which cooperate in a unique manner to provide an apparatus for regulating the transmission of energy through an energy transmissive structure that is economical and easily constructed.

It would, therefore, be advantageous to have an apparatus for regulating the transmission of energy through an energy transmissive structure that employed at least one polymer bag which has an elongated weight attached thereto thereby providing effective regulation of the transmission of energy through the transmissive structure and reducing the costs of construction. The arrangement according to the present invention is comparatively inexpensive to install, which provides an important precondition for its economic application in greenhouses, particularly those with large areas of cultivation.

According to a preferable embodiment the polymer bags inside the greenhouse can form several adjacent rows which effectively block the transmission of energy through the energy transmissive structure. In addition, the polymer bags are coated with a reflective material, metallized, to decrease the transmission of radiant energy there through. Moreover, the reflective material downwardly reflects light energy into the energy transmissive structure.

Therefore, it is an object of this invention to provide an improvement which overcomes the aforementioned inadequacies of the prior art and provides an improvement which is a significant contribution to the advancement of the art of regulating the transmission of energy through transmissive structures.

Accordingly, what is needed in the art is an apparatus which is easily and efficiently installed into energy transmissive structures.

An object of the present invention is to provide a reflective coating onto the polymer bags that downwardly reflects light energy into the energy transmissive structure.

Another object of the present invention is to provide a reflective coating that is made from the group consisting of aluminum paint, nickel paint, silver paint or any other metallic paint.

Yet another object of the present invention is to provide a polymer bag that is made from the group consisting of polyethylene, polyester, polyamide, vinyl, polyvinyl chloride, acrylate or any other plastic material.

Still yet another object of the present invention is to provide a tension spring that assists in holding the elongated weight in a fixed position.

Another object of the present invention is to provide an adjustable tee that allows the elongated support to be adjusted to the appropriate angular orientation to properly fit the transmissive structure.

Yet another object of the present invention is to provide a plurality of holes along the length of the elongated support to communicate the flow of air to the polymer bag.

Still yet another object of the present invention is to provide a slot positioned at an end of the elongated support to allow easy installation and removal of the elongated support from the air distribution header.

Another object of the present invention is to provide a plurality of polymer bags that are properly aligned with the energy transmissive panel of the energy transmissive structure to allow light energy to effectively pass through the polymer bags into the energy transmissive structure.

Yet another object of the present invention is to provide a plurality of polymer bags that are properly aligned with one another to effectively block the transmission of energy through the energy transmissive panel of the energy transmissive structure.

Still yet another object of the present invention is to provide an apparatus for regulating the transmission of energy through an energy transmissive structure having at least one energy transmissive panel comprising in combination at least one elongated support adjacent to the energy transmissive panel of the energy transmissive structure; at least one polymer bag having an outer surface and an inner surface, the inner surface of the polymer bag encapsulating the elongated support, the outer surface of the polymer bag having a reflective coating; at least one elongated weight attached to the polymer bag; and at least one air distribution header attached to the elongated support, the air distribution header controlling an airflow to the inner surface of the polymer bag, whereby the polymer bag is inflated and deflated to regulate the transmission of energy through the transmissive energy panel of the energy transmissive structure.

Another object of the present invention is to provide an apparatus for regulating the transmission of energy through an energy transmissive structure having at least one energy transmissive panel comprising in combination a support structure adjacent to the energy transmissive panel of the energy transmissive structure, the support structure having a plurality of connection ports, the support structure allowing an airflow to communicate to the plurality of connection ports; a plurality of elongated supports being attached to the connection ports; a plurality of polymer bags encapsulating each of the elongated supports, each of the polymer bags having an outer surface and an inner surface, the inner surface of each of the polymer bags encapsulating each of the elongated supports, the outer surface of each of the polymer bags having a reflective coating; a plurality of elongated weights attached to each of the polymer bags; and a plurality of air distribution headers attached to each of the elongated supports, the air distribution headers supplying the airflow to each of the polymer bags, whereby the polymer bags are inflated and deflated to regulate the transmission of energy through the transmissive energy panel of the energy transmissive structure.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiments shown in the attached drawings. For the purposes of summarizing the invention, the invention is an apparatus for regulating the transmission of energy through an energy transmissive structure.

Specifically, an inexpensive polymer bag is supported by an elongated support adjacent to an energy transmissive panel of the energy transmissive structure. An elongated weight maintains the polymer bag in its optimum position in order to regulate the transmission of energy through the energy transmissive structure.

More particularly, the polymer bag encapsulates the elongated support. An air distribution header provides an airflow which allows the polymer bag to be inflated or deflated around the elongated support. Further, the outer surface of the polymer bag has a reflective coating for reflecting energy in the desired direction.

The polymer bag is inflated to block the transmission of energy into or out of the energy transmissive structure. Alternatively, the polymer bag is deflated to allow the transmission of energy through the transmissive energy panel of the energy transmissive structure.

A feature of the present invention is the reflective coating on the polymer bags that downwardly reflects light energy into the energy transmissive structure.

Another feature of the present invention is the reflective coating that is made from the group consisting of aluminum paint, nickel paint, silver paint or any other metallic paint.

Still another feature of the present invention is the polymer bag that is made from the group consisting of polyethylene, polyester, polyamide, vinyl, polyvinyl chloride, acrylate or any other plastic material.

Another feature of the present invention is the tension spring that assists in holding the elongated weight in a fixed position.

Yet another feature of the present invention is the adjustable tee that allows the elongated support to be adjusted to the appropriate angular orientation to properly fit the transmissive structure.

Still yet another feature of the present invention is the plurality of holes along the length of the elongated support that communicate the flow of air to the polymer bag.

Another feature of the present invention is the slot positioned at an end of the elongated support that allows easy installation and removal of the elongated support from the air distribution header.

Yet another feature of the present invention is the plurality of polymer bags that are properly aligned with the energy transmissive panel of the energy transmissive structure that allow light energy to effectively pass through the polymer bags into the energy transmissive structure.

Still yet another feature of the present invention is the plurality of polymer bags that are properly aligned with one another that effectively block the transmission of energy through the energy transmissive panel of the energy transmissive structure.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

The invention will become more readily apparent from the following description of preferred embodiments thereof shown, by way of example only, in the accompanying drawings wherein:

FIG. 1 is a cut away view of the energy transmissive structure showing a preferred embodiment of the apparatus for regulating the transmission of energy in a deflated state;

FIG. 3 is a cut away view of the energy transmissive structure showing another preferred embodiment of the apparatus for regulating the transmission of energy in a deflated state;

Similar reference characters refer to similar parts throughout the several views of the drawings.

DETAILED DESCRIPTION OF THE INVENTION

Figure 2A:
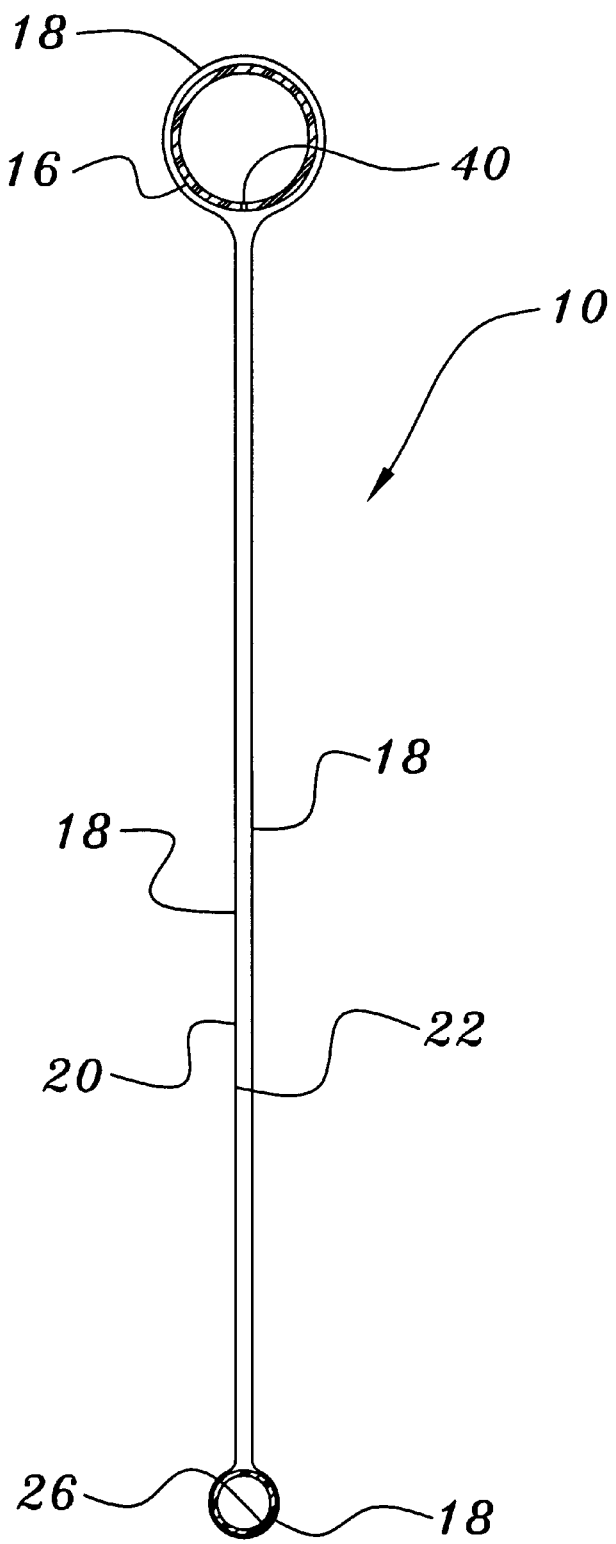
FIG. 2A is a front elevational view of a preferred embodiment of the present invention in a deflated state.

Reference will now be made to the drawings, wherein numeral 10 designates the present invention.

Referring now to FIG. 1, there is shown a cut away view of an energy transmissive structure 12 showing a preferred embodiment of the apparatus for regulating the transmission of energy 10. In this preferred embodiment of the present invention, the apparatus for regulating the transmission of energy 10 through an energy transmissive structure 12 having at least one energy transmissive panel 14 comprising in combination at least one elongated support 16 adjacent to the energy transmissive panel 14 of the energy transmissive structure 12.

The present invention has at least one polymer bag 18 that has an outer surface 20 and an inner surface 22. The inner surface 22 of the polymer bag 18 encapsulates the elongated support 16 which allows the polymer bag 18 to be inflated or deflated around the elongated support 16. In FIG. 1, the polymer bag 18 is shown in a deflated state. By encapsulating the elongated support 16, the polymer bag 18 can be inflated or deflated depending on the desired regulation of the energy through the energy transmissive structure 12. Specifically, when the polymer bag 18 is in a deflated state, both light and heat energy can freely pass through the energy transmissive panel 14 into and out of the energy transmissive structure 12.

The polymer bag 18 can be made from the group consisting of polyethylene, polyester, polyamide, vinyl, polyvinyl chloride, acrylate or any other plastic material. In a preferred embodiment, the polymer bag is made from Mylar™ (a plastic film composed of the polyester polyethylene terephthalate).

Polyethylene terephthalate is a very thin and relatively inexpensive material which allows for ease of installation over the elongated support 16.

The outer surface 20 of the polymer bag 18 has a reflective coating 24 for reflecting energy through the energy transmissive structure 12. The reflective coating 24 on the polymer bag 18 downwardly reflects light energy into the energy transmissive structure 12 when the polymer bag 18 is in a deflated state. The reflective coating 24 can be made from the group consisting of aluminum paint, nickel paint, silver paint or any other metallic paint. In a preferred embodiment, the reflective coating 24 is place on a polymer bag 18 that is made of polyethylene terephthalate.

There is at least one elongated weight 26 that is attached to the polymer bag 18 to ensure that the polymer bag 18 is maintained in its optimum position. In a preferred embodiment, when the polymer bag is deflated, the elongated weight 26 causes the inner surfaces 22 of the polymer bag 18 made of polyethylene terephthalate to touch one another. In this manner, the present invention allows the greatest amount of energy to pass through the energy transmissive structure 12. In addition, a tension spring 36 can be added to assist in holding the elongated weight 26 in a fixed position thereby ensuring that the polymer bag 18 is maintained at its thinnest.

There is at least one air distribution header 28 which is attached to the elongated support 16. The air distribution header 28 controls the airflow 30 to the inner surface 22 of the polymer bag 18. By controlling the airflow 30, the polymer bag 18 can be inflated to block the transmission of energy or deflated to allow the transmission of energy through the transmissive energy panel 14 of the energy transmissive structure 12.

Referring to FIG. 2A, there is shown a front elevational view of a preferred embodiment of the present invention in a deflated state. Specifically, the polymer bag 18 is shown encapsulating the elongated support 16. The inner surfaces 22 of the polymer bag 18 are touching since the elongated weight 26 is pulling the entire polymer bag 18 into a compressed state.

Figure 2B:
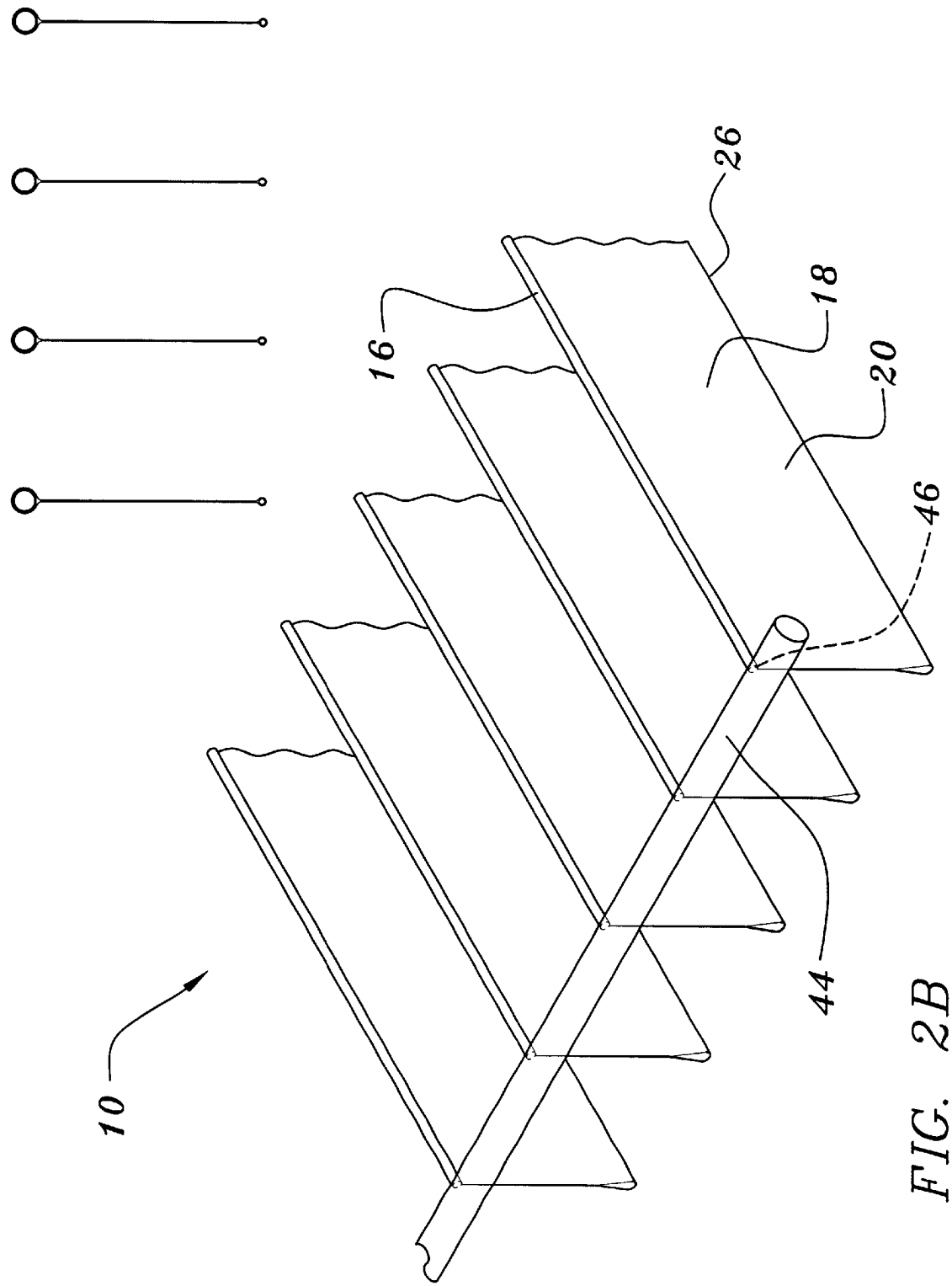
FIG. 2B is a front elevational view of a preferred embodiment of the present invention in a deflated state.

FIG. 2B shows a front elevational view of a preferred embodiment of the present invention in a deflated state. Specifically, the polymer bag 18 is shown encapsulating the elongated support 16. The inner surfaces 22 of the polymer bag 18 are touching since the elongated weight 26 is pulling the entire polymer bag 18 into a compressed state. Also shown is support structure 44 with connection ports 46.

Figure 2C:
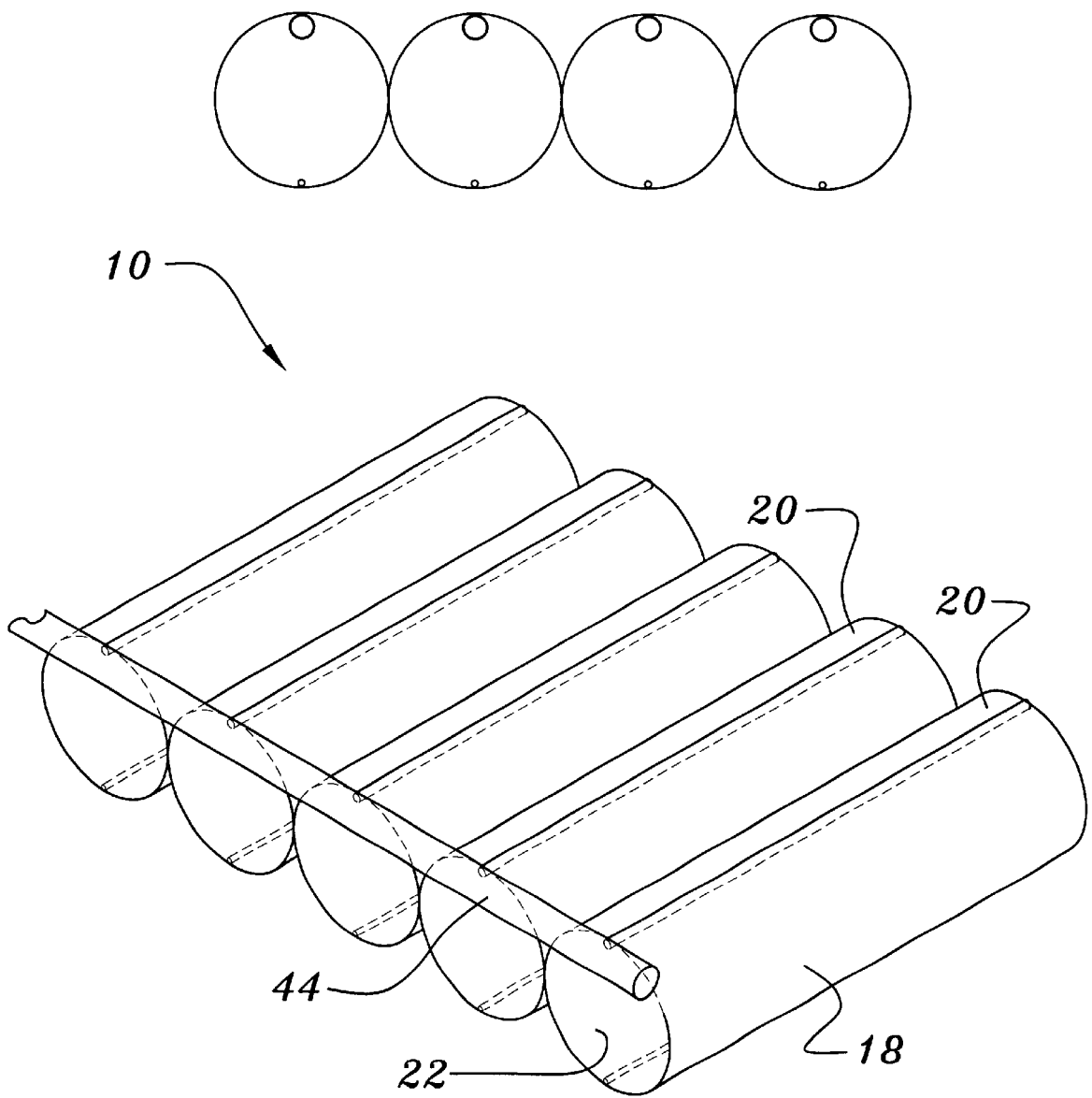
FIG. 2C is a front elevational view of a preferred embodiment of the present invention in an inflated state.

FIG. 2C is a front elevational view of another preferred embodiment of the present invention in an inflated state. Specifically, each of the polymer bags 18 is shown encapsulating each of the elongated supports 16. The outer surfaces 20 of each of the polymer bags 18 are fully expanded. In this preferred embodiment, the polymer bags 18 are inflated to a point where the outer surface 20 of each polymer bag 18 is touching the outer surface 20 of the adjoining polymer bag 18. In this inflated state, the polymer bags block the energy transmissive panel which blocks the transmission of energy through the energy transmissive structure.

FIG. 3 is a cut away view of the energy transmissive structure 12 showing another preferred embodiment of the apparatus for regulating the transmission of energy 10 in a deflated state. In this preferred embodiment of the present invention, the apparatus for regulating the transmission of energy through an energy transmissive structure 12 having at least one energy transmissive panel 14 comprising in combination a support structure 44 adjacent to the energy transmissive panel 14 of the energy transmissive structure 12.

In FIG. 3, the polymer bags 18 are shown in a deflated state. By encapsulating the elongated supports 16, the polymer bags 18 can be inflated or deflated depending on the desired regulation of the energy through the energy transmissive structure 12. Specifically, when the polymer bags 18 are in a deflated state, both light and heat energy can freely pass through the energy transmissive panel 14 into and out of the energy transmissive structure 12.

The polymer bags 18 can be made from the group consisting of polyethylene, polyester, polyamide, vinyl, polyvinyl chloride, acrylate or any other plastic material. In a preferred embodiment, the polymer bag is made from polyethylene terephthalate. Polyethylene terephthalate is a very thin material and relatively inexpensive which allows for ease of installation over the elongated support 16.

The outer surface 20 of each of the polymer bags 18 has a reflective coating for reflecting energy through the energy transmissive structure 12. The reflective coating on each of the polymer bags 18 downwardly reflects light energy into the energy transmissive structure 12 when the polymer bags 18 are in a deflated state. The reflective coating can be made from the group consisting of aluminum paint, nickel paint, silver paint or any other metallic paint. In a preferred embodiment, the reflective coating is placed on the polymer bags 18 that is made of polyethylene terephthalate.

A plurality of elongated weights 26 are attached to each of the polymer bags 18 to ensure that each of the polymer bags 18 are maintained in their optimum position. In a preferred embodiment, when the polymer bags 18 are deflated, the plurality of elongated weights 26 cause the inner surfaces 22 of the polymer bags 18 made of polyethylene terephthalate to touch one another. In this manner, the present invention allows the greatest amount of energy to pass through the energy transmissive structure 12. In addition, a plurality of tension springs 36 can be added to assist in holding the elongated weights 26 in a fixed position thereby ensuring that each of the polymer bags 18 are maintained at their thinnest.

Figure 4A:
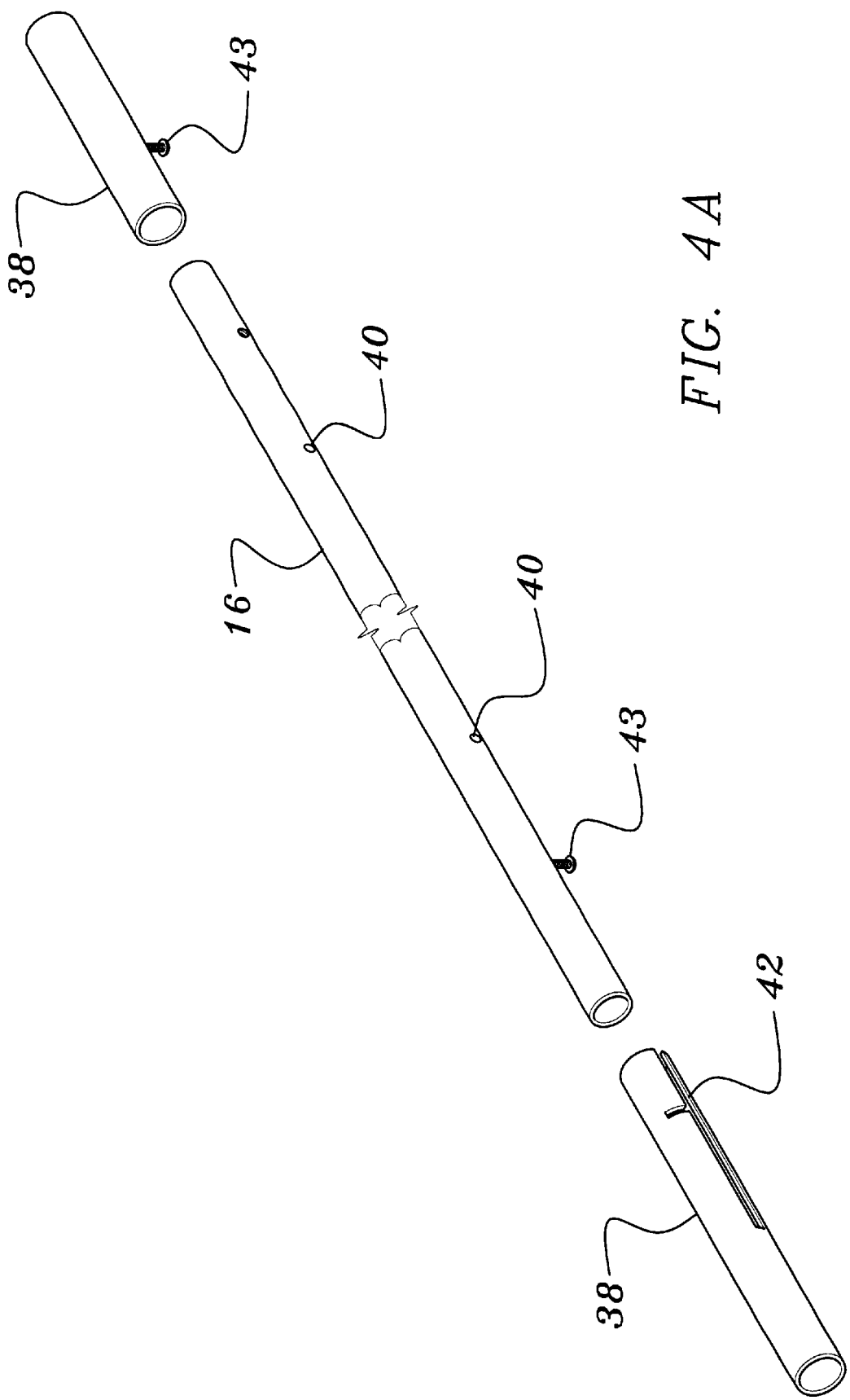
FIG. 4A is an exploded view of an elongated support of the present invention

FIG. 4A is an exploded view of the elongated support 16 of the present invention. In FIG. 4A, a slot 42 for connecting the elongated support 16 of the present invention to the support structure. As shown, the slot 42 is positioned at an end of the elongated support 16. The slot 42 allows for easy installation and removal of the elongated support 16. Further, there are a plurality of holes 40 along the length of the elongated support 16 that communicate the flow of air to each of the polymer bags. In addition, an adjustable tee 38 is provided which allows the elongated support 16 to be adjusted to the appropriate angular orientation to properly fit the transmissive structure. This is useful for energy transmissive structures that have energy transmissive panels that are at various angles within the energy transmissive structure.

Figure 4B:
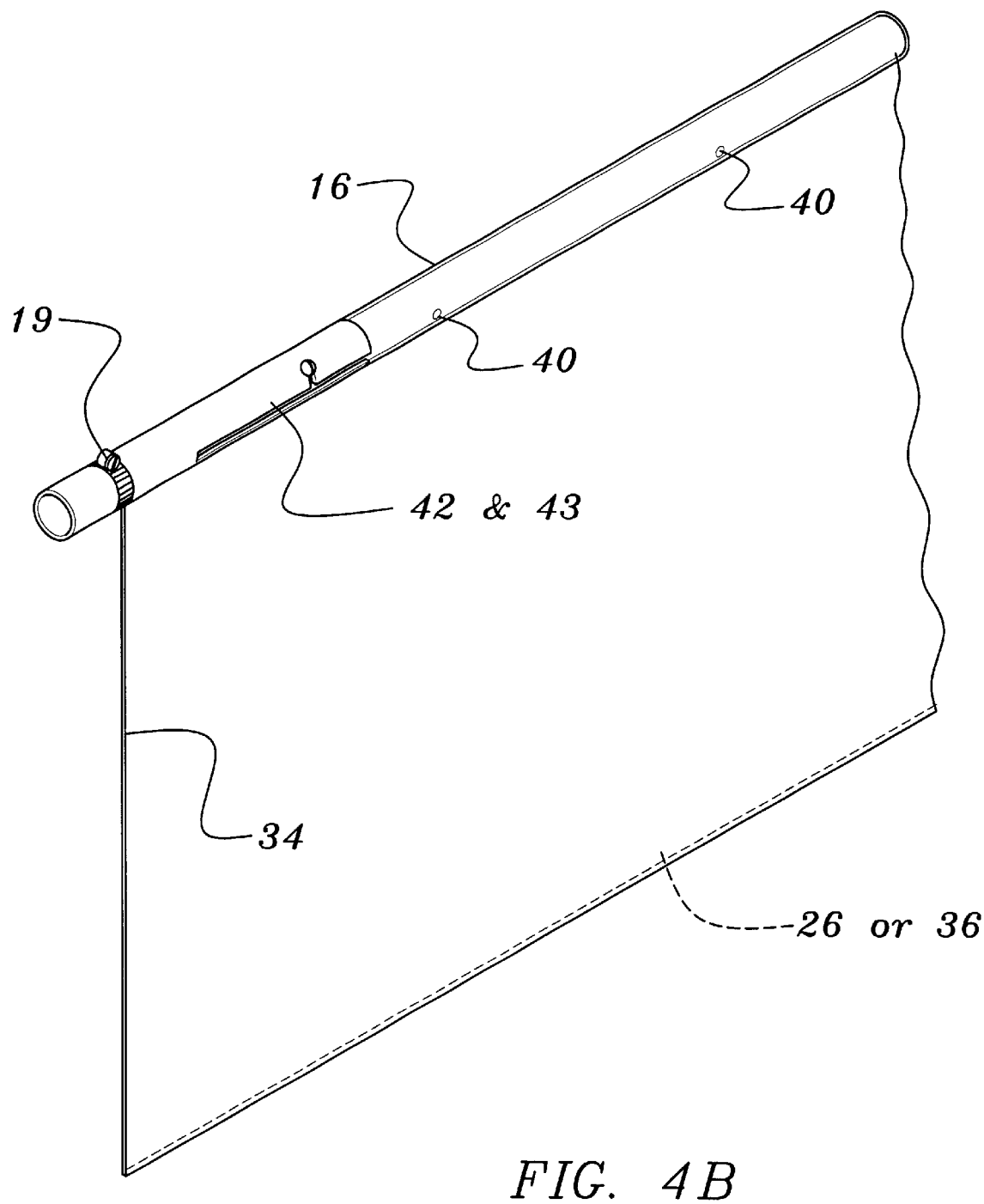
FIG. 4B is a side view of an elongated support of the present invention.
Figure 4C:
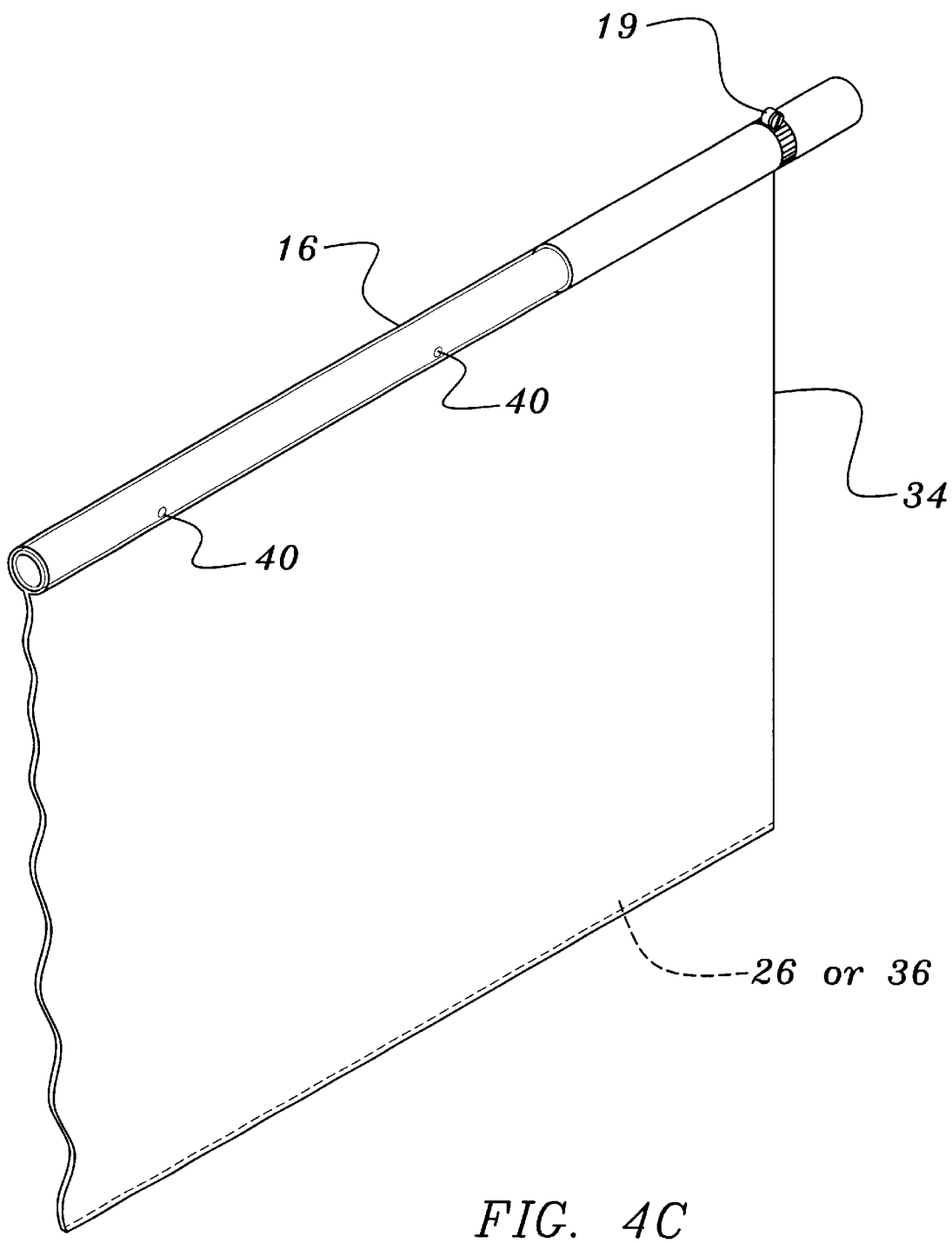
FIG. 4C is a cut away view of an elongated support of the present invention.

FIG. 4B is a side view of an elongated support of the present invention and FIG. 4C is a cut away view of an elongated support of the present invention.

Figure 4D:
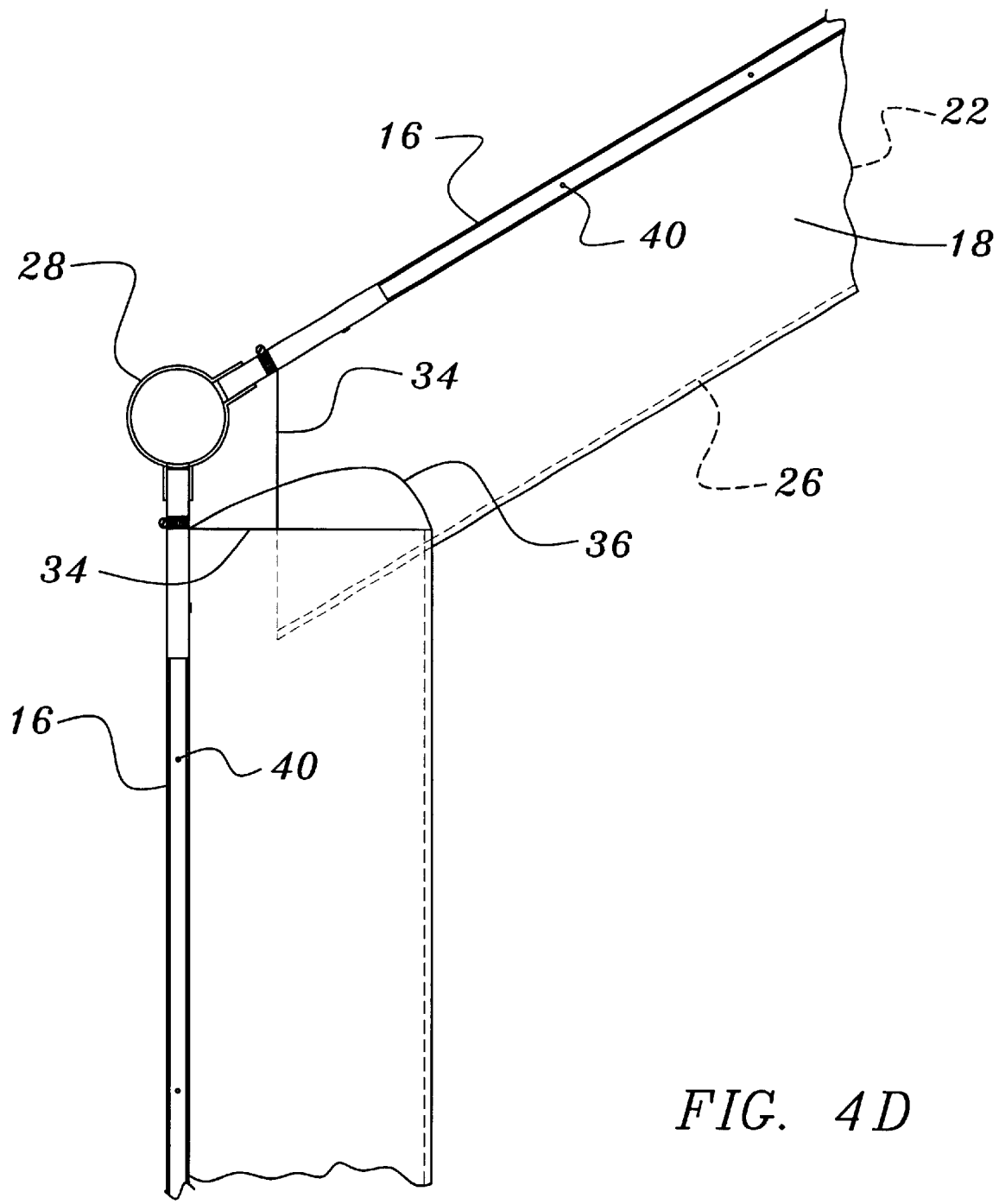
FIG. 4D is a cut away view of an elongated support of the present invention.

In FIG. 4D shows an air distribution header 28 attached to the elongated supports 16 to control airflow to the inner surface 22 of the polymer bag 18. By controlling the airflow, each of the polymer bags 18 can be inflated to block the transmission of energy or deflated to allow the transmission of energy through the transmissive energy panel of the energy transmissive structure.

Figures 5A, 5B:
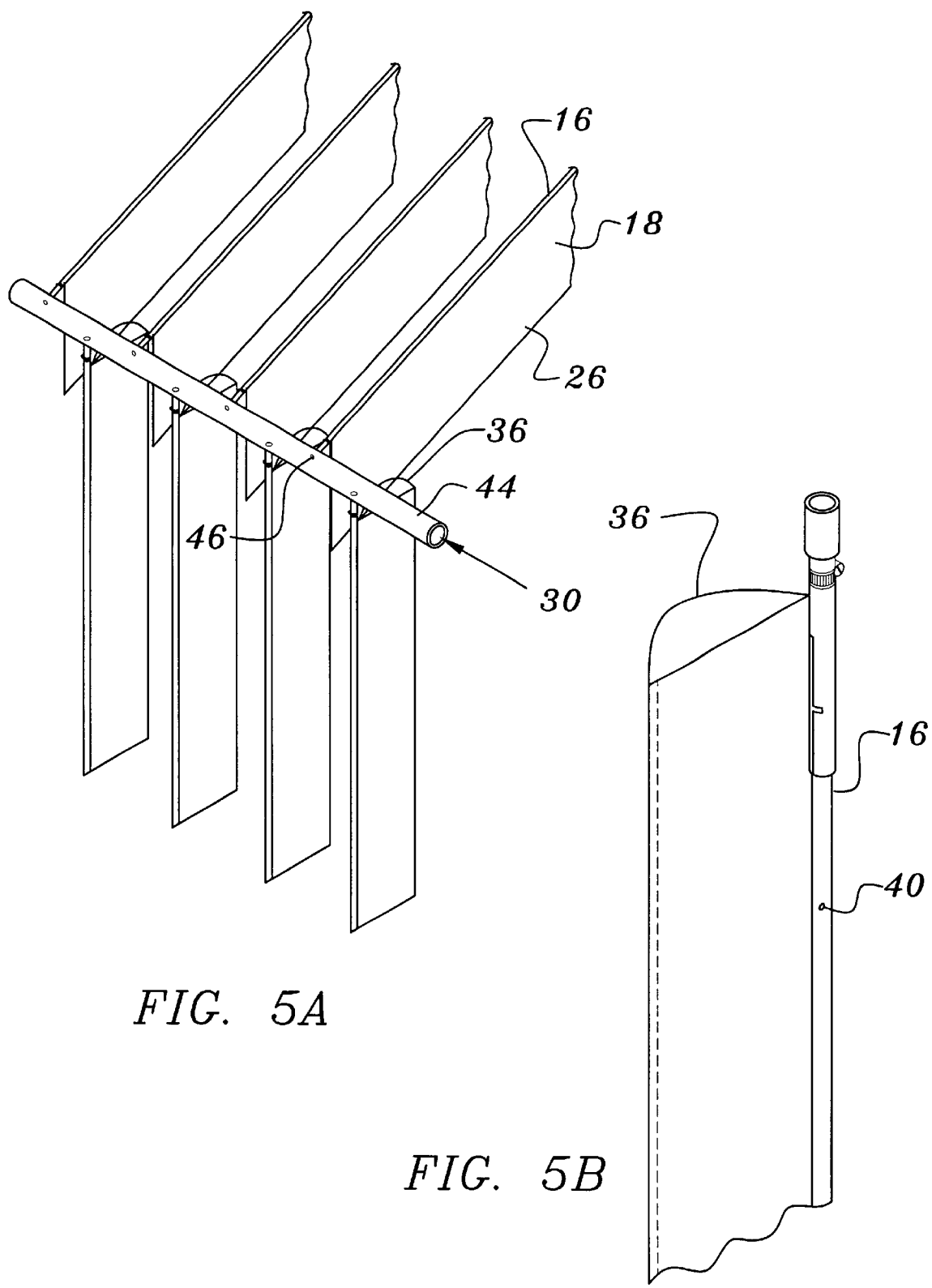
FIG. 5A is a perspective view of a plurality of elongated support of the present invention.
FIG. 5B is a perspective view of an elongated support of the present invention.

As shown in FIG. 5A, the support structure 44 has a plurality of connection ports 46 where an airflow 30 is able to communicate to the plurality of connection ports 46 from the support structure 44. In a preferred embodiment, the support structure is made of PVC tubing to allow for inexpensive and easy installation of the present invention in the energy transmissive structure 12.

There are a plurality of elongated supports 16 that are attached to the connection ports 46 of the support structure 44. A plurality of polymer bags 18 encapsulate each of the elongated supports 16.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

I claim:

1. An apparatus for regulating the transmission of energy through an energy transmissive structure having at least one energy transmissive panel comprising in combination:

at least one elongated support adjacent to the energy transmissive panel of the energy transmissive structure;

at least one polymer bag having an outer surface and an inner surface, said inner surface of said polymer bag encapsulating said elongated support, said outer surface of said polymer bag having a reflective coating; at least one elongated weight attached to said polymer bag; and at least one air distribution header attached to said elongated support, said air distribution header controlling an airflow into said elongated support, through a hole in said elongated support and into said inner surface of said polymer bag, whereby said polymer bag is inflated and deflated to regulate the transmission of energy through the transmissive energy panel of the energy transmissive structure.

2. The apparatus of claim 1, wherein said reflective coating downwardly reflects light energy into the energy transmissive structure during daylight.

3. The apparatus of claim 2, wherein said reflective coating is made from the group consisting of aluminum paint, nickel paint and silver paint.

4. The apparatus of claim 1, wherein said polymer bag is made from the group consisting of polyethylene, polyester, polyamide, vinyl, polyvinyl chloride and acrylate.

5. The apparatus of claim 1, wherein said elongated weight is connected to a tension spring.

6. The apparatus of claim 1, further comprising an adjustable tee through which said airflow flows into said elongated support, said adjustable tee allowing the angular orientation of said elongated support, whereby said elongated support is adjusted to properly fit said energy transmissive structure.

7. The apparatus of claim 1, further comprising:

a plurality of said holes along the length of said elongated support; and a slot positioned at an end of said elongated support for installation and removal of said elongated support from said air distribution header.

8. An apparatus for regulating the transmission of energy through an energy transmissive structure having at least one energy transmissive panel comprising in combination:

a support structure adjacent to the energy transmissive panel of the energy transmissive structure, said support structure having a plurality of connection ports, said support structure allowing an airflow to communicate to said plurality of connection ports;

a plurality of elongated supports being attached to said connection ports;

a plurality of polymer bags encapsulating respective said elongated supports, each of said polymer bags having an outer surface and an inner surface, said inner surface of each of said polymer bags encapsulating respective said elongated supports, said outer surface of each of said polymer bags having a reflective coating;

a plurality of elongated weights attached to each of said polymer bags; and a plurality of air distribution headers attached to each of said elongated supports, said air distribution headers supplying said airflow into said elongated support, through a hole in said elongated support and into respective said polymer bags, whereby said polymer bags are inflated and deflated to regulate the transmission of energy through the transmissive energy panel of the energy transmissive structure.

9. The apparatus of claim 8, wherein said plurality of polymer bags being aligned with said energy transmissive panel to allow light energy to pass through the energy transmissive structure during daylight.

10. The apparatus of claim 9, wherein said reflective coating of said plurality of polymer bags downwardly reflects light energy into the energy transmissive structure during daylight.

11. The apparatus of claim 8, wherein said plurality of polymer bags being aligned with one another to block the transmission of heat energy from said energy transmissive structure through said energy transmissive panel during nighttime.

12. The apparatus of claim 8, wherein said reflective coating is made from the group consisting of aluminum paint, nickel paint and silver paint.

13. The apparatus of claim 8, wherein said polymer bag is made from the group consisting of polyethylene, polyester, polyamide, vinyl, polyvinyl chloride and acrylate.

14. The apparatus of claim 8, wherein said elongated weight is connected to a tension spring.

15. The apparatus of claim 8, further comprising a plurality of adjustable tees through which said airflow flows into said elongated support, said adjustable tees allowing the angular orientation of respective said elongated supports, whereby said elongated supports are adjusted to properly fit said energy transmissive structure.

16. The apparatus of claim 8, further comprising:

a plurality of said holes along the length of each of said elongated supports; and a slot positioned at an end of each of said elongated supports for installation and removal of each of said elongated supports from each of said connection ports.

17. A method for regulating the transmission of energy through an energy transmissive structure having at least one energy transmissive panel, the method comprising:

providing a support structure adjacent to the energy transmissive panel of the energy transmissive structure, said support structure having a plurality of connection ports, providing a plurality of elongated supports being attached to said connection ports;

providing a plurality of polymer bags encapsulating respective said elongated supports, each of said polymer bags having an outer surface and an inner surface, said inner surface of each of said polymer bags encapsulating respective said elongated supports, said outer surface of each of said polymer bags having a reflective coating;

providing a plurality of elongated weights attached to each of said polymer bags;

creating an airflow to communicate to said plurality of connection ports through a plurality of air distribution headers attached to respective said elongated supports, said air distribution headers supplying said airflow through at least one hole in said elongated supports into respective said polymer bags;

inflating said polymer bags to decrease the transmission of energy through the transmissive energy panel of the energy transmissive structure; and deflating said polymer bags to increase the transmission of energy through the transmissive energy panel of the energy transmissive structure.

18. The method of claim 17, wherein said plurality of polymer bags are aligned with said energy transmissive panel to increase light energy into the energy transmissive structure during daylight.

* * * * *